May 1, 1928.
A. C. STEWART
ROTARY MACHINE
Filed Sept. 8, 1924
1,668,532
2 Sheets-Sheet 2
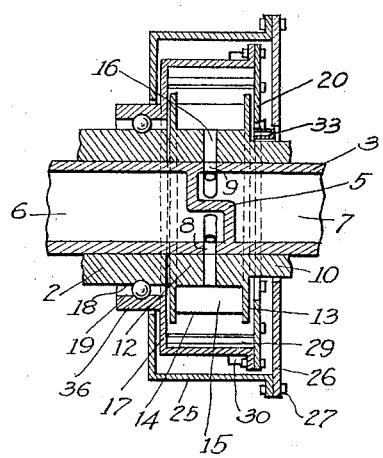
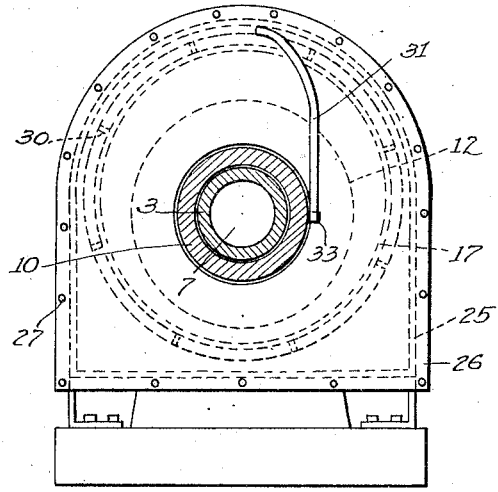
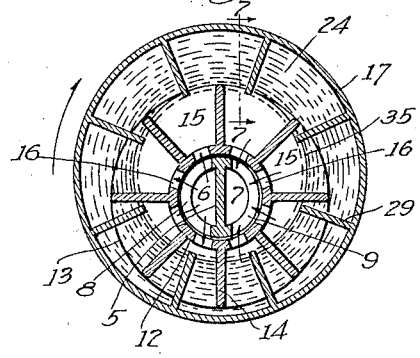
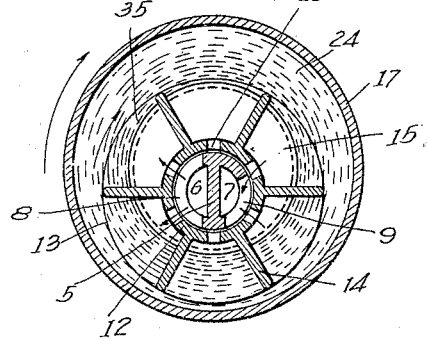
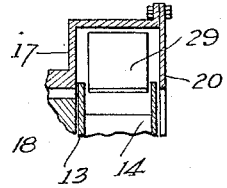
INVENTOR.
Alfred C. Stewart
BY Arthur P. Knight
ATTORNEY.

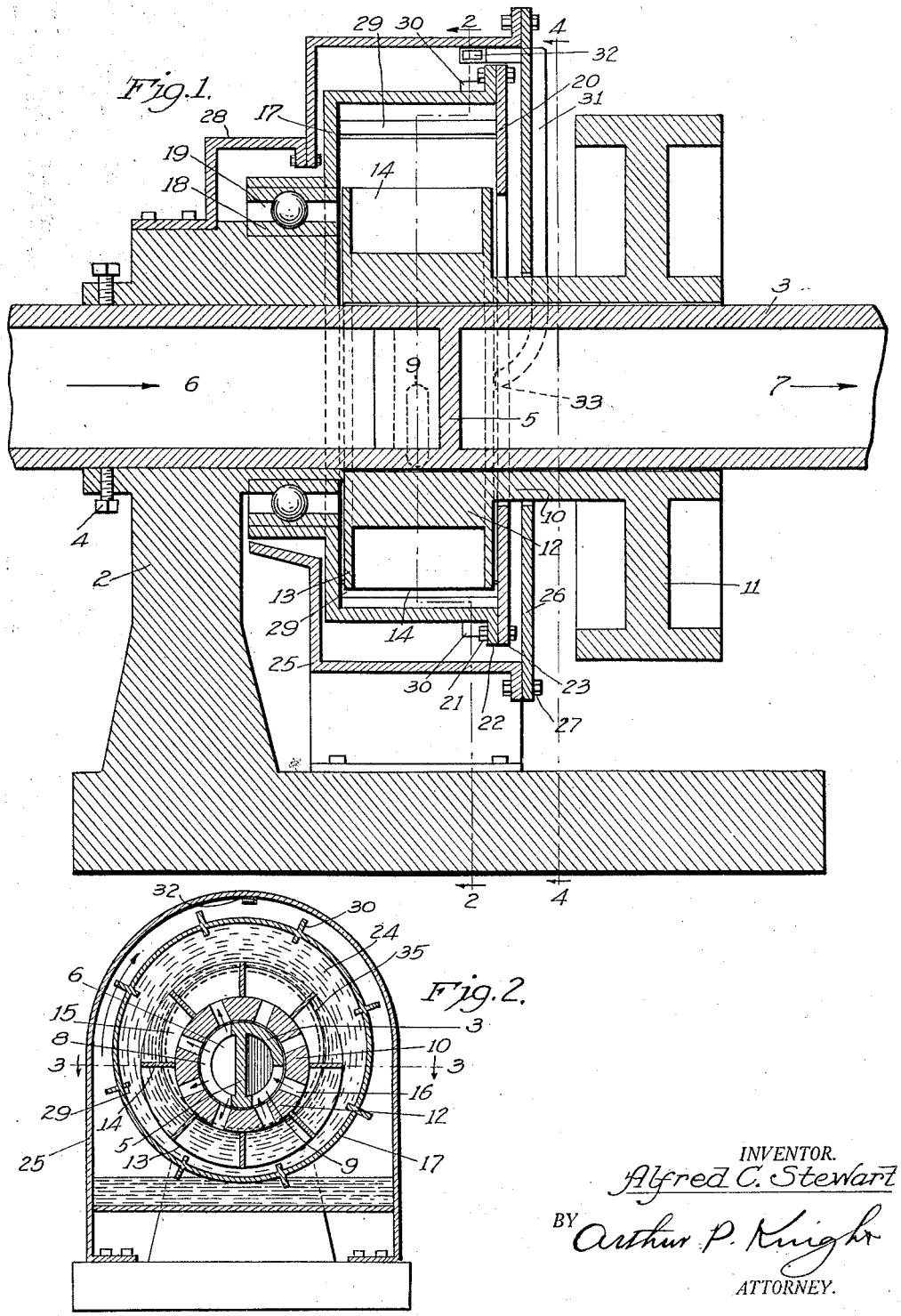

Patented May 1, 1928.

1,668,532

UNITED STATES PATENT OFFICE.

ALFRED C. STEWART, OF PASADENA, CALIFORNIA; W. L. STEWART EXECUTOR OF SAID ALFRED C. STEWART, DECEASED.

ROTARY MACHINE.

Application filed September 8, 1924. Serial No. 736,517.

This invention relates to a rotary machine adapted for use either as a pump or as an engine or motor and the main object of the invention is to provide a machine of this type which is extremely simple, efficient, and durable. A further object of the invention is to provide a rotary machine which is substantially free from sliding friction and in which the friction between the metallic surfaces is reduced to a minimum. Another object of the invention is to avoid as far as possible the necessity of maintaining a tight working joint between metallic surfaces. Another object of the invention is to provide a pump which will start readily and automatically build up to full load after starting. Other advantages of my invention will appear hereinafter.

The accompanying drawings illustrate embodiments of my invention and referring thereto:

Fig. 1 is a vertical section through the center of the machine.

Fig. 2 is a transverse vertical section on line 2—2 in Fig. 1.

Fig. 3 is a horizontal section on line 3—3 in Fig. 2, the inner rotary member being in a different position.

Fig. 4 is a transverse vertical section on line 4—4 in Fig. 1.

Figs. 5 and 6 are partial transverse sections similar to Fig. 2 showing modified forms of the inner and outer rotary members.

Fig. 7 is a partial transverse section on line 7—7 in Fig. 5.

Although my machine is adapted for use as a pump or as an engine, for the sake of simplicity the construction and operation of the same will first be described particularly with reference to its use as a pump.

My machine may comprise for example suitable supporting means such as base 1 and standard 2 upon which is rigidly mounted in any suitable manner a shaft 3, said shaft extending for example through a supporting bearing in standard 2 and being held rigidly in position by set screws 4 or otherwise. Said shaft is preferably hollow and is adapted to provide for inlet and outlet of the gas or fluid being pumped. For this purpose the hollow space within shaft 3 may be divided by wall or partition 5 into an inlet opening 6 at one end and an outlet opening 7 at the other end, and suitable ports or openings 8 and 9 may be provided in the shaft, said openings communicating respectively with passages 6 and 7.

An inner rotary member or compression chamber carrier 10 is mounted to rotate on shaft 3 and is provided with suitable driving means such as pulley 11. Said inner rotary member is provided with a central hub portion 12 and with outwardly extending flange or rim portions 13. The annular space between said flanges is divided by partitions or vanes 14 into a plurality of working or compression chambers or pockets 15. Said working chambers are provided with suitable communicating means such as openings 16 in the hub portion 12, said openings being adapted to register alternately with inlet and outlet openings 8 and 9 in the central shaft.

An outer rotary member 17 is also provided, enclosing the inner rotary member and mounted to rotate on an axis eccentric thereto, for example the rotary member 17 may be mounted on bearing 18 formed on or otherwise mounted on standard 2 and in order to reduce the friction to a minimum suitable ball bearings 19 may be provided. To facilitate assembly of the machine the outer rotary member is preferably open at one side and provided with suitable removable face member 20, said member 20 being adapted to be secured to member 17, for example by means of bolts 21 extending through flanges 22 and 23 on members 17 and 20. Member 17 may be provided with inwardly extending ribs or fins 29, the purpose of which will appear hereinafter. During the operation of the machine the outer rotary member is adapted to carry and maintain a rotating body of liquid such as water, oil or mercury indicated at 24, said body of liquid acting as a liquid piston on the fluid contained in the working chambers 15 as hereinafter described An outer fixed casing or jacket 25 is also mounted on the base 1, said casing also being open at one side and provided with a removable face 26 adapted to be secured thereto by suitable means such as bolts 27. In order to provide a more rigid support, casing 25 may also be attached by means of bracket or other suitable means 28 to the upper part of standard 2. Casing 25 is adapted to hold a body of the liquid to be used within the pump as a liquid piston means as above described so that such liquid may be supplied to the interior of the outer rotary member 17 when the pump is started. Any suitable means may be provided for causing the liquid contained in the casing 25 to be so supplied, for example rotary member 17 may be provided exteriorly with projecting ribs or fins 30 adapted upon rotation of said member to carry the liquid upward and throw it outward by centrifugal force and a feed pipe or tube 31 may be mounted on the outer casing 25 or on the removable face 26 thereof, said pipe having at its upper end an opening 32 adapted to receive the liquid thrown upward and outward by fins 30 and said pipe being adapted to discharge such liquid at a point within the outer rotary member 17 as indicated at 33.

The operation of the above described machine as a pump is as follows:

The inner rotary member 10 is set in rotation, and it being understood that there will always remain within the outer rotary member 17 a certain amount of liquid even when the machine is at rest, such liquid will be set in rotation and will in turn cause the outer rotary member to rotate, for example, by impact or engagement of the liquid against the ribs or inward projections 29 and the inside of said member 17. More liquid will thus be supplied to the interior of rotary member 17 by means of fins 30 and pipe 31 as above described until the space within the annular walls of said member is substantially filled therewith, the level of the liquid in said member during operation being substantially as indicated at 35. Any excess liquid introduced within rotary member 17 in this manner, over and above the amount which said member will hold, will of course be thrown out at the sides thereof and collected by casing 25 and returned to the lower portion of said casing.

It will be understood that the speed of rotation of the inner rotary member is sufficiently high to cause the above described starting operations to take place almost immediately and the centrifugal force acting on the body of liquid 24 will be sufficient to cause the inner surface of the same to assume great rigidity against distortion and to thereby serve as a very effective liquid piston on the gas within the working chambers 15. Since the body of liquid is carried around with the outer member, its inner surface will be eccentric to the inner rotary member 10 and will cooperate with the working chambers 15 to alternately increase and decrease the effective volume thereof.

The direction of rotation being as indicated by the arrow in Fig. 2, the gas being pumped will then be drawn into the chambers at the left side of said figure through the inlet opening 8 and the respective passages 16. As each working chamber ascends at this side of the machine its volume will be increased until it reaches the top of the machine at which time the volume is a maximum and the communication with inlet opening 8 is then cut off. In general in pumping a gas it is desirable to provide for a certain amount of compression of the same within the pump and I have therefore provided for a cut off between the inlet and outlet opening 8 and 9. With such an arrangement the gas within the chambers descending at the right of Fig. 2 is first compressed due to the decrease in volume in such chambers until the respective openings 16 come into register with the outlet opening 9 when the compressed gas is forced out through such opening and discharged through outlet 7.

In the form shown in Fig. 2, the ribs 29 on the outer rotary member do not actually engage with any part of the inner rotary member, the rotation of said outer rotary member being effected entirely by the agency of the intervening body of liquid. The ribs 29 serve however to limit relative rotational movement between the outer rotary member and the body of liquid and to cause said rotary member and liquid to rotate substantially together. While such an arrangement will in general be sufficiently effective I may prefer in some cases to provide the outer rotary member with means adapted to mechanically engage suitable means on the inner rotary member so that the rotation of the outer member is made more positive, which is of especial advantage during starting of the machine. For example, as shown in Figs. 5 and 7 said projections 29 may extend inwardly to approximately the normal liquid level in the outer rotary member, thus not only insuring positive rotation of the outer member when the inner member is rotated, but also serving to substantially prevent relative rotational movement between the outer rotary member and the body of liquid and more effectively maintain the body of working liquid in position at the point of maximum pressure, namely at the bottom of Fig. 5. In this case projections 29 do not extend entirely across the annular space within the outer rotary member, but are cut away at the edges as shown in Fig. 7 so as to permit them to enter within the compression chambers 15. I may also use my machine to pump liquids for example by using a relatively heavy liquid such as mercury as a working liquid, to pump a relatively light liquid such as water or alcohol, and in such case there will be no cut-off between inlet opening 8 and outlet opening 9 so that the discharge will begin immediately after the completion of the intake as indicated in Fig. 5.

Instead of driving the inner rotary member, it is possible in some cases, and especially with the form of the invention shown in Figs. 5 and 7, to apply the driving power to the outer rotary member. For this purpose the fixed casing 25 may be so formed as to permit attachment of a driving wheel or pulley to the hub 36 of the outer rotary member. The inner rotary member will then be caused to rotate, for example, by engagement of projections 29 with vanes 14. It is also possible to drive both the inner and the outer rotary members by external means.

In other cases in order to provide a more simple construction and especially where the pump is to be in substantially continuous operation, so that a slight retardation in starting is no serious objection, I may eliminate the inwardly projecting fins or ribs 29 on the outer rotary member as shown in Fig. 6, depending entirely upon the friction of the liquid carried around by the inner rotary member upon starting of the pump against the inner surface of the outer rotary member to set the same into rotation.

While I have described the construction and operation of my rotary machine as a pump, its operation as an engine may be readily understood. For example steam, compressed air, or other working fluid may be introduced through one end of the shaft, and preferably through the passage 7 which served as an outlet opening when used as a pump, and discharged through the passage 6 in the other end. The pressure of such steam or air within the working chambers will then cause the parts to rotate in the reverse direction to that indicated in Fig. 2 and the cut-off between the openings 8 and 9 will serve to permit expansion of the working medium to substantially exhaust pressure, that is the pressure in the passage 6, before discharge. It will of course be understood that when used as an engine it will be necessary to first set the machine in operation by some external means in order to provide the rotating body of liquid 24 adapted to serve as a liquid piston.

The use of my machine is not limited to use as a pump or engine but may be used in any case where expansion or compression of a gas is desired, and it is particularly applicable for example when such gas is to be first compressed and later expanded, in which case the inner rotary members of two machines similar to that above described may be connected together and provided with external driving means, one machine being adapted to serve as a compressor in the manner above described for pumps and the other as an expander in the manner above described for engines. The external driving means then serves not only to start the machine in operation and establish the rotating body of working liquid within the outer rotary member of the expander, but also to supply the necessary power in addition to that derived from the expansion of the gas itself during operation.

What I claim is:—

1. A rotary machine comprising a shaft, an inner rotary member mounted to rotate on said shaft and provided with a plurality of outwardly extending vanes defining outwardly opening working chambers between said vanes and with passages communicating with the respective working chambers, inlet and outlet means adapted to alternately register with said passages upon rotation of said rotary member, an outer rotary member mounted to rotate on an axis eccentric to said inner rotary member and provided with means for maintaining therein during rotation thereof an annular body of liquid whose inner surface is eccentric to said inner rotary member so as to cooperate with said working chamber to alternately increase and decrease the volume thereof, means for rotating the inner rotary members, and a plurality of vanes extending inwardly from said outer rotary member and adapted to project into the working chambers between the vanes on the inner rotary member during a portion at least of the rotary movement of said rotary members so as to provide mechanical interengagement between said rotary members.

2. A rotary machine comprising a shaft, an inner rotary member mounted to rotate on said shaft and provided with a plurality of outwardly opening working chambers and with passages communicating with the respective working chambers, inlet and outlet means adapted to alternately register with said passages upon rotation of said rotary member, an outer rotary member mounted to rotate on an axis eccentric to said inner rotary member and provided with means for maintaining therein during rotation thereof an annular body of liquid whose inner surface is eccentric to said inner rotary member so as to cooperate with said working chambers to alternately increase and decrease the volume thereof, means for rotating the inner rotary member, and a plurality of vanes extending inwardly from said outer rotary member approximately to the inner surface of said body of liquid throughout substantially the entire width of said working chambers to substantially prevent relative rotational movement between said outer rotary member and said body of liquid.

3. A rotary machine comprising a shaft, an inner rotary member mounted to rotate on said shaft and provided with a plurality of outwardly opening working chambers and with passages communicating with the respective working chambers, inlet and outlet means adapted to alternately register with said passages upon rotation of said rotary member, an outer rotary member mounted to rotate on an axis eccentric to said inner rotary member and provided with means for maintaining therein during rotation thereof an annular body of liquid whose inner surface is eccentric to said inner rotary member so as to cooperate with said working chambers to alternately increase and decrease the volume thereof, means for rotating the inner rotary member, housing means surrounding said outer rotary member and adapted to contain a body of liquid in its lower portion and to collect and return to such lower portion any excess liquid from the outer rotary member, means for conducting liquid into the interior of said outer rotary member, and means on said outer rotary member and adapted upon rotation thereof to supply liquid from the lower portion of said housing means to said liquid conducting means.

In testimony whereof I have hereunto subscribed my name this 30th day of August, 1924.

ALFRED C. STEWART.